United States Patent
Berg et al.

(10) Patent No.: US 7,396,467 B2
(45) Date of Patent: Jul. 8, 2008

(54) METHOD OF PREPARING A CHROMATOGRAPHY MATRIX

(75) Inventors: Hans Berg, Uppsala (SE); David Buckley, Uppsala (SE); Maria Brännholm, Uppsala (SE); Anders Hagvall, Uppsala (SE); Henrik Ihre, Sundbyberg (SE); Eva Holmgren, Uppsala (SE); Anders Larsson, Bromma (SE); Dag Lindstrom, Vattholma (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 146 days.

(21) Appl. No.: 10/964,269

(22) Filed: Oct. 13, 2004

(65) Prior Publication Data

US 2006/0060534 A1    Mar. 23, 2006

(30) Foreign Application Priority Data

Sep. 22, 2004   (SE) .................................. 0402322

(51) Int. Cl.
*B01D 15/08* (2006.01)
(52) U.S. Cl. .................... 210/635; 210/656; 210/198.2; 210/502.1
(58) Field of Classification Search ................ 210/656, 210/635, 198.2, 502.1; 536/3, 124
See application file for complete search history.

(56) References Cited

U.S. PATENT DOCUMENTS

| | | | | |
|---|---|---|---|---|
| 3,956,273 A | * | 5/1976 | Guiseley | 536/120 |
| 4,973,683 A | * | 11/1990 | Lindgren | 536/120 |
| 5,135,650 A | * | 8/1992 | Hjerten et al. | 210/198.2 |
| 5,143,646 A | * | 9/1992 | Nochumson et al. | 204/469 |
| 5,541,255 A | * | 7/1996 | Kozulic | 525/54.3 |
| 5,728,457 A | * | 3/1998 | Frechet et al. | 428/310.5 |
| 5,998,606 A | * | 12/1999 | Grandics | 536/123.1 |
| 6,602,990 B1 | * | 8/2003 | Berg | 536/3 |
| 6,635,174 B1 | * | 10/2003 | Berg et al. | 210/198.2 |
| 6,689,715 B1 | * | 2/2004 | Hammen et al. | 502/405 |

OTHER PUBLICATIONS

Gel Filtration—Principles and Methods; Handbook from Pharmacia LKB Biotechnology, 5th Edition, 1991, pp. 41-42.

* cited by examiner

*Primary Examiner*—Ernest G Therkorn
(74) *Attorney, Agent, or Firm*—Yonggang Ji

(57) ABSTRACT

The present invention relates to a method of preparing a porous cross-linked polysaccharide chromatography matrix, which comprises to provide an aqueous solution of a gellable polysaccharide, wherein part of the hydroxyl groups are substituted with groups which are not susceptible to nucleophilic attack; to provide essentially spherical droplets of the substituted polysaccharide solution; to form a gel of the substituted polysaccharide solution; and to cross-link the gel by adding a cross-linking agent. The invention also encompasses a chromatography column packed with a matrix so produced as well as use thereof in e.g. protein purification.

11 Claims, No Drawings

METHOD OF PREPARING A CHROMATOGRAPHY MATRIX

TECHNICAL FIELD

The present invention relates to separation and purification of target molecules, such as biomolecules, and more specifically to a chromatography matrix and a novel method for preparing the same. The invention also encompasses the use of such a matrix in liquid chromatography, and a chromatography column packed with the matrix.

BACKGROUND OF THE INVENTION

The recent advances in the field of biotechnology have required faster and more accurate techniques for recovery, purification and analysis of biological and biochemical substances, such as proteins. Electrophoresis and chromatography are two commonly used such techniques.

In electrophoresis, charged particles are separated by migration in an electric field. More specifically, a sample is placed on a soft solid support medium, such as an agarose or polyacrylamide gel slab, which in turn is placed between two electrodes, a positively charged anode and a negatively charged cathode. As the current is switched on, each component of the sample will migrate at a characteristic rate determined by its net charge and its molecular weight. One essential property of a well working electrophoresis gel is its melting point, which affects the ability to extract the migrated target compounds from separate gel spots. Thus, a low melting point gel is commonly advantageous. Native agarose is commonly used in electrophoresis gels, but they have been noted to involve some problems. For example, even though the coarse pore structure of the native agarose is excellent for resolving large macromolecules, for smaller molecules smaller molecular weight agarose must be prepared. This is commonly obtained by increasing the agarose content of the gel, which however produces high viscosities in the solutions rendering casting of gels thereof difficult. To overcome such problems and others, modified agarose has been suggested for electrophoresis gels.

Electrophoresis is discussed in U.S. Pat. No. 3,956,273 (Guiseley), which relates to agarose or agar compounds useful for electrophoresis or diffusive interactions, but also as thickeners. The compounds have been modified with alkyl and alkenyl groups in order to lower their gelling and melting temperatures, and to increase their clarity as compared to the unmodified material. More specifically, the agar or agarose is first dissolved in strong alkali, after which a suitable reagent is added to provide the modification. A difunctional agent such as epichlorohydrin may be used, but only under conditions which prevent cross-linking.

Electrophoresis is also discussed in U.S. Pat. No. 5,143,646 (Nochumson et al), which relates to electrophoretic resolving gel compositions comprising polysaccharide hydrogels, such as agarose, which has been derivatised and depolymerised sufficiently to reduce its casting-effective viscosity. The disclosed compositions do not require any cross-linking or polymerising agents.

Further, U.S. Pat. No. 5,541,255 (Kozulic) relates to gels for electrophoresis, and more specifically to cross-linked linear polysaccharide polymers. The gels are formed by dissolving a polysaccharide in a solvent such as water; adding a cross-linking agent, which is not charged nor which becomes charged upon contact with water; and incubating the mixture in a quiescent state to simultaneously react the polysaccharide and the cross-linking agent and to gel the product into a slab. According to U.S. Pat. No. 5,541,255, the prior art electrophoresis gels could be redissolved by water, while the U.S. Pat. No. 5,541,255 invention provides a gel which is water insoluble. These properties are obtained due to the simultaneous cross-linking and gelation, and also due to the high ratio of cross-linker to polysaccharide.

In chromatography, two mutually immiscible phases are brought into contact. More specifically, the target compound is introduced into a mobile phase, which is contacted with a stationary phase. The target compound will then undergo a series of interactions between the stationary and mobile phases as it is being carried through the system by the mobile phase. The interactions exploit differences in the physical or chemical properties of the components in the sample. In liquid chromatography, a liquid sample, optionally combined with a suitable buffer constitutes the mobile phase, which is contacted with a stationary phase, known as a separation matrix. Usually, the matrix comprises a support to which ligands, which are groups capable of interaction with the target, have been coupled.

Separation matrices are commonly based on supports made from inorganic materials, such as silica, or organic materials, such as synthetic or natural polymers, or the like. The synthetic polymers, such as styrene and divinylbenzene, are often used for supports that exhibit some hydrophobicity, such as size exclusion chromatography, hydrophobic interaction chromatography (HIC) and reverse phase chromatography (RPC). Further, the synthetic polymers are sometimes preferred over natural polymers due to their flow properties, which may be more advantageous since synthetic polymers are often more rigid and pressure-resistant than the commonly used natural polymer supports.

The natural polymers, which are commonly polysaccharides such as agarose, have been utilised as supports of separation matrices for decades. Due to the presence of hydroxyl groups, the surfaces of the natural polymers are usually hydrophilic, giving essentially no non-specific interactions with proteins. Another advantage of the natural polymers, which is of specific importance in the purification of drugs or diagnostic molecules for internal human use, is their non-toxic properties. Agarose can be dissolved in water at increased temperature, and will then form a porous gel upon cooling to a certain temperature (the gelling point). On heating, the gel will melt again at a temperature (the melting point), which is usually considerably higher than the gelation point. The gelation involves helix-helix aggregation of the polysaccharide polymers, and is sometimes referred to as a physical cross-linking. To optimise the target mass transport rate and the area with which the target interacts, it is often desired to increase the porosity of the support, which can be achieved by varying the agarose concentration. However, another essential parameter to consider is the flow properties of the support. The matrix is normally used in the form of a packed bed of particles (spherical or non-spherical). When the mobile phase is forced through the bed, the back pressure of the bed will mainly be controlled by the interstitial channels between the particles. At low flow rates, the particles can be regarded as incompressible and then the back pressure increases linearly with the flow rate, with the slope depending on the particle size. At higher flow rates, the particles may start to deform under the hydrostatic pressure, resulting in diminishing diameters of the interstitial channels and a rapidly increasing back pressure. At a certain flow rate, depending on the rigidity of the matrix, the bed will collapse and the back pressure approaches infinity unless it is switched off automatically by the chromatography system. To improve the rigidity and hence the flow properties of agarose, it is frequently cross-linked. Such cross-linking takes place between available hydroxyl groups, and may be obtained e.g. with epichlorohydrin.

U.S. Pat. No. 4,973,683 (Lindgren) relates to the cross-linking of porous polysaccharide gels, and more specifically to a method of improving the rigidity while minimising the non-specific interaction of a porous polysaccharide gel. The method involves providing an agarose gel and a reagent denoted "monofunctional", which comprises a reactive group, such as a halogen group or an epoxide group, and a double bond. The reagent is bound to the gel via its reactive group; and the double bond is then activated into an epoxide or halohydrin, which is finally reacted with hydroxyl groups on the agarose to provide cross-linking.

U.S. Pat. No. 5,135,650 (Hjertén et al) relates to highly compressible chromatographic stationary phase particles, such as agarose beads, which are sufficiently rigid for HPLC and non-porous to the extent that it is impenetrable by solutes. More specifically, such beads are produced by starting from porous agarose beads, which are contacted with an organic solvent to collapse the porosity, after which the bead surfaces inside the collapsed pores are cross-linked to fix the pores in their collapsed state. Alternatively, the beads are produced by filling the pores with a polymerisable substance, which grafts to the pore surfaces, and performing graft polymerisation. One stated advantage of the invention disclosed is that a single stationary phase is effective at high pressures and yet can be used at low pressures.

U.S. Pat. No. 6,602,990 (Berg) relates to a process for the production of a porous cross-linked polysaccharide gel, wherein a bifunctional cross-linking agent is added to a solution of polysaccharide and allowed to bind via its active site to the hydroxyl groups of the polysaccharide. A polysaccharide gel is then formed from the solution, after which the inactive site of the cross-linking agent is activated and cross-linking of the gel performed. Thus, the cross-linking agent is introduced into the polysaccharide solution, contrary to the above discussed methods wherein it is added to a polysaccharide gel. The bifunctional cross-linking agent comprises one active site, i.e. a site capable of reaction with hydroxyl groups of the polysaccharide, such as halides and epoxides, and one inactive site, i.e. a group which does not react under the conditions where the active site reacts, such as allyl groups. Thus, the present bifunctional cross-linking agent corresponds to the "monofunctional reagents" used according to the above-discussed U.S. Pat. No. 4,973,683 (Lindgren). Particles comprised of the resulting gel have been shown to present an improved capability of withstanding high flow rates and back pressures. A drawback with the U.S. Pat. No. 6,602,990 method is that bromine is required for the activation of the cross-linking agent.

Finally, U.S. Pat. No. 5,998,606 (Grandics) relates to a method of synthesising chromatography media, wherein cross-linking and functionalisation of a matrix takes place simultaneously. More specifically, double bonds provided at the surface of a polymeric carbohydrate matrix are activated in the presence of a metallic catalyst to cross-link the matrix and functionalise it with halohydrin, carboxyl or sulphonate groups. The double bonds are provided at the matrix surface by contact with an activating reagent, which contains a halogen atom or epoxide and a double bond. Thus, the U.S. Pat. No. 5,998,606 activating reagent corresponds to the U.S. Pat. No. 4,973,683 monofunctional reagent and the U.S. Pat. No. 6,602,990 bifunctional cross-linking agent.

Thus, even though there are a number of techniques available for producing cross-linked polysaccharide separation matrices, since different applications will put different requirements on the matrix, there is still a need within this field of alternative methods.

SUMMARY OF THE INVENTION

In one aspect of the present invention, a method is provided for preparing a rigid cross-linked polysaccharide chromatography matrix.

In another aspect of the invention, a method is provided for preparing a highly porous cross-linked polysaccharide chromatography matrix.

In a specific aspect of the invention, a method is provided for preparing a rigid cross-linked polysaccharide chromatography matrix, which method utilises different materials and/or starting materials. In a specific aspect, a method is provided wherein the use of halogens such as bromine is avoided.

In yet another aspect of the invention, a chromatography matrix is provided, which is comprised of cross-linked polysaccharide particles and which can withstand high flow rates and/or back pressures.

These and other objects may be achieved as defined in the appended claims. Other objects and advantages of the present invention will appear from the detailed description that follows.

DEFINITIONS

The term separation "matrix" means herein a material comprised of a porous or non-porous solid support, to which ligands have been attached. In the field of chromatography, the matrix is sometimes denoted resin or media.

The term "ligands" is used herein in its conventional meaning, i.e. for chemical entities which are capable of interacting with a target compound, such as charged groups capable of interacting with an oppositely charged target compound in an ion-exchange process.

$K_{av}$ is a gel filtration (size exclusion chromatography) parameter defined as $(V_e-V_0)/(V_t-V_0)$, where $V_e$ is the elution volume of the test molecule peak, $V_0$ is the void volume of the column and $V_t$ is the total bed volume. $K_{av}$ is a measure of the fraction of the stationary phase volume accessible to the particular test molecule. $K_{av\,DX}$ is $K_{AV}$ for dextran molecules. In the examples, dextrans of molecular weight 110 kD, 500 kD and 1000 kD have been used.

A "gelling point", sometimes herein denoted the "gelling temperature" means the temperature at which the polymers of a solution interacts physically to form a solid gel.

The term "gellable" means herein capable of forming a physical gel.

DETAILED DESCRIPTION OF THE INVENTION

In a first aspect, the present invention relates to a method of preparing a cross-linked polysaccharide chromatography matrix, which method comprises the steps of (a) providing an aqueous solution of a gellable polysaccharide, wherein part of the hydroxyl groups are substituted with groups which are not susceptible to nucleophilic attack;

(b) providing essentially spherical droplets of the substituted polysaccharide solution;

(c) forming a gel of the substituted polysaccharide solution; and (d) cross-linking the gel by adding a cross-linking agent.

In a specific embodiment, the method comprises the steps of
(a) providing an aqueous solution of a gellable polysaccharide;
(b) substituting part of the hydroxyl groups of the polysaccharide in the aqueous solution with groups that are not susceptible to nucleophilic attack once substituted;
(c) providing essentially spherical droplets of the substituted polysaccharide solution;
(d) forming a gel of the substituted polysaccharide solution; and
(e) cross-linking the gel by adding a cross-linking agent.

Thus, in the first embodiment, the starting material is readily substituted polysaccharide, while in the specific embodiment; the present invention also comprises the steps of substituting hydroxyl groups of the polysaccharide. As the skilled person knows, available hydroxyl groups are present on all surfaces of the polysaccharide, and accordingly the substituents will be present on pore surfaces as well as on the external surfaces of the matrix. More specifically, the polysaccharide provided has been substituted with groups which are not susceptible to nucleophilic attacks. Consequently, such groups are not reactive with hydroxyl groups, and are therefore sometimes herein denoted "non-reactive groups" or simply substituents. The opposite kind of groups, i.e. groups which are "reactive" in the present context, are electrophilic groups or groups that are easily converted to electrophilic groups, such as e.g. allyl groups (easily epoxidised), epoxides, halohydrins, $\alpha,\beta$-unsaturated carbonyls, which are all readily reactive with hydroxyl groups. By using non-reactive groups, the stability of the substituted polymer is improved and it is easier to control the subsequent cross-linking step. The part of the hydroxyl groups which are substituted in the polysaccharide according to the present invention is about 10%, such as about 5% and more specifically about 2%. Thus, in one embodiment, the part of the hydroxyl groups which is substituted is in a range of 1-20%, such as 2-10% and more specifically 2-5%.

In one embodiment of the present method, the non-reactive substituents are selected from the group consisting of ethers, esters, amides and xanthates. In one embodiment, the substituents present on the polysaccharide are ethers, such as alkyl ethers, e.g. methyl, ethyl, propyl, and butyl ethers; hydroxyl ethers, such as hydroxypropyl and hydroxybutyl ethers; glycerol; oligoglycerol; oligoethylene glycol or polyethers of any one of the above mentioned others. In an advantageous embodiment, part of the hydroxyl groups of the polysaccharide is substituted with hydroxyethyl ether groups.

In another embodiment, the substituents present on the polysaccharide are esters, such as alkyl esters and hydroxyl alkyl esters.

In yet another embodiment, the substituents present on the polysaccharide are amides, such as carbamides or carbamide derivatives.

In a further embodiment, the substituents present on the polysaccharide are xanthate salts or xanthate esters.

Readily substituted polysaccharides are available e.g. from Cambrex Bioproducts, USA. In the best embodiment of the invention, the substituted polysaccharide is hydroxyethyl agarose. Methods of modifying polysaccharides are readily available to those of skill in this field; see e.g. U.S. Pat. No. 3,956,273, which relates to electrophoresis gels comprised of such substituted polysaccharides. As discussed in U.S. Pat. No. 3,956,273, the substitution of the polysaccharide lowers its gelling temperature, which would have been expected to disturb the pore structure of the product and which obviously is a sign of a weaker binding. However, the present invention shows the contrary, as the chromatography matrices prepared according to the invention exhibits improved flow properties as compared to the corresponding cross-linked product made from non-substituted polysaccharide, see experimental part below.

The cross-linking of the gel so obtained may be carried out according to well known methods in the field, see e.g. the above-discussed U.S. Pat. No. 4,973,683 and U.S. Pat. No. 6,602,990. Thus, in one embodiment of the present method, to provide cross-linking, a cross-linking agent is added, such as epichlorohydrin.

In one embodiment, the non-reactive substituents i.e. groups that are not susceptible of nucleophilic attack are cleaved off after cross-linking. It is understood that the way of cleaving off such groups will depend on the nature of the group, and the skilled person in this field can easily select the suitable conditions for each case. In an advantageous embodiment, the non-reactive substituents are ester groups which are subsequently cleaved off by hydrolysis. Available hydroxyl groups of the polysaccharide are then further functionalised to the desired kind of chromatography matrix, as discussed below.

However, even though the main role of the non-reactive substituents of the polysaccharide in the present method is to allow the polysaccharide solution to form the specific cross-linked gel that presents the improved flow properties shown in the experimental part, they can also be used for further functionalisation. In an advantageous embodiment, both the non-reactive substituents and any remaining non-substituted hydroxyl groups are functionalised. Such functionalisation may be provided with charged groups into an ion-exchange matrix; with groups that exhibits biological affinity into an affinity matrix; with chelating groups into an immobilised metal affinity chromatography (IMAC) matrix; or with hydrophobic groups into a hydrophobic interaction chromatography (HIC) matrix. In a specific embodiment, the functional groups are ion-exchange ligands selected from the group that consists of quaternary ammonium (Q), diethylaminoethyl (DEAE), diethylaminopropyl—found in catalogue! (ANX), sulphopropyl (SP), and carboxymethyl (CM) groups. Thus, in an alternative embodiment, the non-reactive substituents are used in a subsequent step for attachment of chromatography ligands. In this embodiment, the substituents are advantageously ether groups. Methods for attachment of such functional groups to a support are well known to the skilled person in this field and may involve a preceding step of allylation of the substituent and use of standard reagents and conditions. (See e.g. Immobilized Affinity Ligand Techniques, Hermanson et al, Greg T. Hermanson, A. Krishna Mallia and Paul K. Smith, Academic Press, INC, 1992.) In a specific embodiment, the non-reactive substituents constitute the ligands, e.g. by providing hydrophobic interactions with a target substance. In such HIC chromatography, an illustrative substituent would be alkyl ether groups.

The polysaccharide may be selected from the group that consists of agarose, agar, cellulose, dextran, chitosan, konjac, curdlan, carrageenan, gellan, and alginate. In an advantageous embodiment of the present method, the polysaccharide is agarose.

In a specific embodiment, the melting and/or gelling temperature of the polysaccharide is at least about 1° C. lower than the corresponding non-substituted polysaccharide.

In one embodiment of the present method, the chromatography matrix is comprised of porous, essentially spherical particles. The average particle size of the particles may be in a range of 10-300 µm, preferably 30-200 µm or more preferably 45-165 µm, such as about 45 µm, in diameter. Such porous polysaccharide supports are easily prepared by the skilled person in this field according to standard methods, such as inverse suspension gelation (S Hjertén: Biochim Biophys Acta 79(2), 393-398 (1964). For example, when preparing agarose, the essentially spherical droplets of polysaccharide solution are obtained by first dissolving or dispersing the agarose in an aqueous solvent, such as water, or any other commonly used solvent, at a temperature above the melting point of the specific polysaccharide. If required, a porogen may be added to ensure the desired porosity of the product. In the case of a non-substituted polysaccharide, it is then substituted as discussed above. The dissolved substituted polysaccharide is then emulsified in a commonly used organic solvent such as toluene or heptane with stirring, after which the temperature is lowered to below the gelling point of the polysaccharide, such as room temperature. The particles so produced may be washed to remove any trace of solvent and cross-linked as discussed above. Thus, in one embodiment of the present method, the dissolved substituted polysaccharide is emulsified in an organic solvent. In an alternative embodiment, the essentially spherical droplets of polysaccharide solution are obtained by spraying a composition of a thermally-gelling polymer in an aqueous medium into ambient air and allowing the atomised composition to gel in the air, as disclosed in U.S. Pat. No. 6,248,268 (FMC Corporation), which is hereby incorporated herein via reference. In a specific embodiment, the aqueous solution of polysaccharide is provided by heating and the gel is formed by reducing the temperature.

In one embodiment of the present method, a porogen is added before gelation to provide a suitable pore size. Suitable porogens are well known to the skilled person in this field. In this context, the present chromatography matrix may exhibit a porosity of at least about 90%, such as about 94% and more specifically about 96%.

A second aspect of the invention is a chromatography matrix produced as described above. In one embodiment, the chromatography matrix is comprised of essentially spherical particles and exhibits a $K_{av}$ value for a dextran of 110 kDa of at least about 0.4, preferably >0.5.

A third aspect of the invention is a chromatography column packed with a matrix prepared as described above. In an advantageous embodiment, the column is made from any conventional material, such as a biocompatible plastic, e.g. polypropylene, or glass. The column may be of a size suitable for laboratory scale or large-scale purification. In a specific embodiment, the column according to the invention is provided with luer adaptors, tubing connectors, and domed nuts. Thus, the present invention also encompasses a kit comprised of a chromatography column packed with a separation matrix as described above; at least one buffer; and written instructions for purification of target molecules; in separate compartments. The present invention also encompasses a chromatography matrix presented in other formats, such as in fluidised beds and batch vessels. Alternatively, the matrix can be applied to a surface, such as a chip.

The target molecules may be any biological molecules, such as peptides, proteins, such as receptors and antibodies, nucleic acids, such as DNA, RNA and oligonucleotides, virus, and prokaryotic or eukaryotic cells, or organic molecules, such as drug candidates etc.

A last aspect of the present invention is the use of a chromatography matrix prepared as described above to purify, isolate or remove a biomolecule or organic molecule from a liquid. Thus, this aspect is a method of liquid chromatography, as discussed above, and involves adsorbing a target compound or molecule to the matrix and optionally a subsequent step of selective desorption of the target, commonly known as gradient elution. If required, one or more washing steps are provided between adsorption and elution. Alternatively, the present use is for retardation of a target compound or molecule, in which case the target is selectively retarded on the column, as compared to other components. In this case, there is no need of an elution step. In one embodiment of the present use, a liquid flow of at least about 300 cm/h is applied to a matrix comprised of essentially spherical particles that exhibit a $K_{av}$ of at least about 0.4 for dextran of molecular weight 110 kD.

In a specific aspect, the matrix prepared according to the present invention is used for cell culture. A further use of the matrix is for immobilisation of enzymes to produce a biocatalyst.

EXAMPLES

The present examples are provided for illustrative purposes only, and are not to be construed as limiting the present invention as defined by the appended claims. All references given below and elsewhere in the present specification are hereby included herein by reference.

Materials/Investigated Units

Epichlorohydrin

Sodium borohydride

Sodium sulphate

Methods

Example 1

Preparation of Cross-linked Agarose Beads 7 g hydroxyethyl agarose (NuSieve™ GTG, Cambrex) was dissolved under stirring in 200 ml distilled water for 30 min in a boiling water bath. The solution was charged to a 1.5 l flat-bottomed glass vessel held at 60° C., containing a solution of 2 g triglycerol diisostearate (Prisorine™ 3700, Uniqema) in 300 ml toluene. The stirring rate (40 mm turbine agitator) was 400 rpm during charging and was then increased to 650 rpm for 20 min and to 800 rpm for 20 min. The hydroxyethyl agarose droplets were then gelated by cooling the vessel from 60° C. to 20° C. during an interval of 30 min. 1 l ethanol was added and the vessel content was stirred for 15 min and then left to sediment. The supernatant was decanted and the beads were then washed with ethanol and water on a G3 glass filter funnel. The mode diameter of the recovered beads was 99 μm, as measured with a Malvern Mastersizer light diffraction instrument.

285 g beads obtained as described above were added to a flask and stirred at 200 rpm with a two-blade agitator. 137 g sodium sulphate was added and dissolved by heating to 50° C. with 200 rpm stirring. The stirring was continued for 30 min after the target temperature of 50° C. had been reached. 10.7 ml 50% NaOH was added, followed by 0.4 g sodium borohydride. 54 ml 50% NaOH and 80 ml epichlorohydrin was then pumped in over 7 h using Dosimat™ pumps (feed rates: 50% NaOH—0.129 ml/min, epichlorohydrin 0.190 ml/min). The reaction mixture was then left under 200 rpm stirring over night at 50° C. Then the gel slurry was neutralised to pH 5.1 using 60% acetic acid and the gel was washed with water on a glass filter. Finally, the beads were sieved between 40 and 160 μm sieves.

Example 2

Preparation of Cross-linked Agarose Beads

Beads comprising substituted agarose in gel form were prepared in accordance with Example 1.

The beads were then cross-linked according to the same procedure as in Example 1, except that the temperature throughout was kept at 70° C.

Example 3

Pressure-flow Performance

The beads obtained as described above were packed into an HR 5/5 column (Amersham Biosciences, Uppsala, Sweden), which was attached to a P-900 pump (Amersham Biosciences, Uppsala, Sweden). A 50% ethanol solution was pumped through the column at an initial flow rate of 0.5 ml/min. The flow rate was increased in steps of 0.5 ml/min every 30 s, until a dramatic back pressure increase was observed. The highest flow rate before the pressure increase was noted as the max flow of the gel in question. The results are presented in Table 1 below.

Example 4

Porosity Determination

The beads were packed into a HR10 column, giving a bed height of 15 cm. The column was mounted in an FPLC system with LCC Plus/FPLC Director, a P-500 pump and an MV-7 UV-M detector. Coloured dextran samples (0.1% solutions, 0.2 ml) were injected and eluted isocratically with 0.05 M tris 0.15 M NaCl, pH 8.0 at a flow rate of 0.2 ml/min (15 cm/h). As a reference, a column was packed with Sepharose™ 4FF (Amersham Bioscience, Uppsala, Sweden) and evaluated in the same way. The results are presented in Table 1 below.

TABLE 1

| Sample | Crosslink temp | Max flow (ml/min) | Kav* Dx 1400 kD | Kav* Dx 500 kD | Kav* Dx 110 kD |
|---|---|---|---|---|---|
| Example 1 | 50° C. | 5.0 | 0.18 | 0.65 | 0.77 |
| Example 2 | 70° C. | 8.5 | 0.05 | 0.63 | 0.76 |
| Sepharose ™ 4FF | — | 3.5 | 0.06 | 0.56 | 0.69 |

*Kav values determined in accordance with Gel Filtration Principles and Methods, Pharmacia LKB Biotechnology 1991 (ISBN 91-97-0490-2-6)

The beads produced according to the present invention have larger pores than the reference agarose matrix Sepharose™ 4FF and allow a considerably higher flow rate.

While preferred illustrative embodiments of the present invention are described, one skilled in the art will appreciate that the present invention can be practiced by other than the described embodiments, which are presented for purposes of illustration only and not by way of limitation. The present invention is limited only by the claims that follow.

What is claimed is:

1. A method of preparing a chromatography column, which method comprises the steps of
   (a) providing an aqueous solution of a gellable polysaccharide, wherein part of the hydroxyl groups are substituted with groups which are not susceptible to nucleophilic attack;
   (b) providing essentially spherical droplets of the polysaccharide solution;
   (c) forming a gel of the essentially spherical droplets;
   (d) cross-linking the gel by adding a cross-linking agent to form a porous cross-linked polysaccharide chromatography matrix; and
   (e) packing said porous cross-linked polysaccharide chromatography matrix in a chromatography column;
   wherein said porous cross-linked polysaccharide chromatography matrix allows higher flow rate of said column than matrix made from non-substituted polysaccharide.

2. The method of claim 1, wherein the groups which are not susceptible to nucleophilic attack are selected from the group consisting of ethers, esters, amides and xanthates.

3. The method of claim 1, wherein the dissolved substituted polysaccharide is emulsified in an organic solvent.

4. The method of claim 1, wherein a porogen is added before gelation.

5. The method of claim 1, wherein the aqueous solution of polysaccharide is provided by heating and the gel is formed by reducing the temperature.

6. The method of claim 1, wherein the polysaccharide is agarose.

7. The method of claim 1, wherein the gelling point of the polysaccharide is at least about 1° C. lower than that of the corresponding non-substituted polysaccharide.

8. The method of claim 1, further comprising cleaving off the groups which are not susceptible to nucleophilic attack, after cross-linking.

9. The method of claim 8, wherein the groups which are not susceptible to nucleophilic attack are ester groups cleaved off by hydrolysis.

10. The method of claim 1, which further comprises attaching chromatography ligands to hydroxyl groups of the gelled polysaccharide after cross-linking thereof.

11. A method of preparing a chromatography column, which method comprises the steps of
   (a) providing an aqueous solution of a gellable polysaccharide;
   (b) substituting part of the hydroxyl groups of the polysaccharide in the aqueous solution with groups that are not susceptible to nucleophilic attack once substituted;
   (c) providing essentially spherical droplets of the substituted polysaccharide solution from step (b);
   (d) forming a gel of the essentially spherical droplets;
   (e) cross-linking the gel by adding a cross-linking agent to form a porous cross-linked polysaccharide chromatography matrix; and
   (f) packing said porous cross-linked polysaccharide chromatography matrix in a chromatography column;
   wherein said porous cross-linked polysaccharide chromatography matrix allows higher flow rate of said column than matrix made from non-substituted polysaccharide.

* * * * *